United States Patent Office 3,019,169
Patented Jan. 30, 1962

3,019,169
SALICYLATE DRY SHELL COATING OF DRY 4-AMINOQUINOLINE CORE, AND DRY-COMPRESSING TABLET-MAKING PROCESS
Theodore G. Klumpp, Port Washington, J. Edward Wolff, South Schodack, and Leonard L. Kaplan, Albany, N.Y., assignors to Sterling Drug Inc., New York, N.Y., a corporation of Delaware
No Drawing. Filed June 23, 1958, Ser. No. 744,014
10 Claims. (Cl. 167—82)

This invention relates to medicinal compositions and to their preparation. These compositions are useful as anti-rheumatic agents, for instance, as anti-inflammatory agents for the treatment of rheumatoid arthritis.

In recent years a number of workers in search of drugs for treatment of rheumatic diseases have reported that 4-amino-quinoline-type antimalarial drugs, e.g., 7-chloro-4-(4-diethylamino - 1-methylbutylamino)quinoline diphosphate (chloroquine phosphate) and 7 - chloro-4-[4-(N-ethyl - N - 2 -hydroxyethylamino) - 1 - methylbutylamino] quinoline sulfate (hydroxychloroquine sulfate), are effective for this purpose.

However, the 4 - aminoquinoline-type antimalarial drugs, when administered as antirheumatic agents have a very slow onset of action, and several months may elapse after medication has begun before any improvement can be perceived. During this period the co-administration of a salicylate gives the patient especially beneficial results because of the action of the salicylate in providing relief of pain, diminution of the inflammatory process, and stimulation of the adrenal cortex.

In search for an improved antirheumatic remedy in unit dosage form containing as essential ingredients both a 4-aminoquinoline-type antimalarial drug and a salicylate, e.g., containing chloroquine phosphate and aspirin or hydroxychloroquine sulfate and aspirin, we first prepared conventional tablets containing said ingredients but found these tablets to be unsatisfactory in having a bitter taste, poor disintegration properties and poor stability, as evidenced by discoloration and salicylic acid crystal formation on storage.

We have now found that a stable antirheumatic composition can be obtained by formulating a tablet containing a dry-compressed core comprising a 4-aminoquinoline-type antimalarial drug and adjuvants, and a dry-compressed shell coating comprising a salicylate and adjuvants, said tablet on storage retaining its original rapid disintegration properties, aspirin content and physical appearance, i.e., no discoloration or crystal formation. Further, these tablets did not have the objectionable bitter taste possessed by the above-described conventional tablet which contained the same essential ingredients.

By a 4-aminoquinoline-type antimalarial drug we mean both the aminoquinoline in free base form and its acid-addition salts. These 4-aminoquinoline-type antimalarial drugs were studied extensively during and after World War II and are well known in the art, e.g., see the Andersag et al. U.S. Patent 2,233,970 and Wiselogle's "Survey of Antimalarial Drugs 1941–1945," volumes I–III, J. W. Edwards, Ann Arbor, Michigan, 1946. Preferred embodiments of the 4-aminoquinoline-type antimalarial drugs as used herein are acid-addition salts of chloroquine and hydroxychloroquine, e.g., chloroquine phosphate, hydroxychloroquine sulfate.

By a salicylate we mean a derivative of salicyclic acid well-known to have analgesic and/or antirheumatic properties, e.g., acetylsalicylic acid (aspirin), ethyl salicylate, salicylamide, sodium salicylate, ammonium salicylate, etc., the preferred embodiment being aspirin.

By adjuvants we mean excipients necessary for imparting satisfactory properties to the tablet, said excipients including: diluents, e.g., lactose, calcium carbonate, dibasic calcium phosphate ($CaHPO_4 \cdot 2H_2O$), magnesium carbonate, kaolin; disintegrators, e.g., starch; lubricants, e.g., talcum, magnesium stearate, stearic acid; and, alternatively, flavors, e.g., a fruit flavor, vanilla, chocolate, licorice. Preferred adjuvants used in formulating the core of our tablet were lactose and dibasic calcium phosphate as diluents, starch as the disintegrator, and talcum and magnesium stearate or stearic acid as lubricants. Preferred adjuvants used in formulating the shell coating around the core were starch, lactose and dibasic calcium phosphate.

Another aspect of our invention is the process for the preparation of the above-described stable medicinal composition in tablet form which comprises the steps of dry-compressing in granular form a 4-aminoquinoline-type antimalarial drug and adjuvants and then dry-compressing in granular form around the resulting core tablet a shell coating comprising a salicylate and adjuvants. Important features of the process are: the formation of the core and the final tablet by dry compression, thereby obviating the use of an aqueous or aqueous-alcohol medium; and, the use of the core and shell ingredients in granular form. Avoidance of water is desirable to prevent decomposition of aspirin or other salicylates. Use of the ingredients in granular form, e.g., about 12–50 mesh resulted in highly satisfactory tablets.

We obtained best results in our process using the same granular diluent in preparing the core and the shell coating. A particularly preferred diluent contained lactose and dibasic calcium phosphate with a small quantity of starch. In practice, we found especially suitable a granular diluent of approximately No. 16 mesh size and containing approximately 49% (by weight) each of lactose and dibasic calcium phosphate and approximately 2% (by weight) of starch. Such a granular diluent has the advantages of carrying with it other ingredients in flowing from the hopper into the dies of a tablet machine and in having an excellent compressible nature. Because of the latter property, its use in our process affords a strong bond between the core tablet and the shell coating, thereby lessening the chance of tablet splitting, which is a major problem in the formation of press-coated tablets.

The dosage quantities can be varied, using the principle of the invention herein described, to meet the needs of patients as determined by the prescribing physician. The following description is illustrative of the several variations within the range of unit dosages generally found desirable. For a tablet weighing about 0.5 gram, a quantity of a 4-aminoquinoline-type antimalarial drug in salt form weighing in the range of about 0.02 to 0.10 gram and a quantity of salicylate, e.g., aspirin, weighing in the range of about 0.15 to 0.30 gram were found satisfactory.

In addition to the essential ingredients of the tablets of this invention, other medicaments can be incorporated therein, preferably in the core. Such other medicaments are preferably those having antirheumatic and/or sedative properties, including corticosteroids, e.g., prednisone, cortisone, etc.; muscle relaxing agents, e.g., mephenesin, 2-(4-chlorophenyl) - 3 - methyl-4-metathiazanone-1-dioxide; and the like.

The following examples will further illustrate the invention without, however, limiting it thereto.

*Example 1*

The preparation of a granular diluent comprising lactose, dibasic calcium phosphate and a small quantity of starch is illustrated by the following granulation containing 49% (by weight) each of lactose and dibasic calcium phosphate and 2% (by weight) of starch: The lactose (U.S.P.) and dibasic calcium phosphate (U.S.P.) are mixed well to obtain uniform dispersion of the powders. A starch paste in distilled water (10% by weight of starch) was prepared by warming with stirring the starch (U.S.P.) and water. The starch paste was added to the powdered mixture of lactose and dibasic calcium phosphate; and the resulting mixture was mixed well with sufficient distilled water to obtain damp, powder-free granules. The wet material was passed through a No. 8 mesh screen and dried at about 50–55° C. The dried material was then passed through a No. 16 mesh screen. The resulting granular diluent was used in the following examples and as used therein will be designated "diluent granulation No. 16 mesh."

*Example 2*

This example illustrates a tablet weighing about 0.5 g. and containing a dry-compressed core comprising about 0.05 g. of a 4-aminoquinoline-type antimalarial drug and adjuvants, and a dry-compressed shell coating comprising about 0.3 g. of a salicylate and adjuvants. Thus, tablets each containing 0.050 g. of chloroquine phosphate in the core and 0.300 g. of aspirin in the shell coating were prepared as follows.

The core was prepared using the following ingredients.

| Ingredient: | Parts by weight |
|---|---|
| Chloroquine phosphate (96.93%) | 258 |
| Diluent granulation No. 16 mesh | 216 |
| Starch | 60 |
| Talcum | 60 |
| Magnesium stearate | 6 |

After the chloroquine phosphate had been passed through a No. 20 mesh screen, the above ingredients, except the magnesium stearate, were mixed well. The mixture was then dry slugged and the slugs were ground and screened to No. 16 mesh granules. The magnesium stearate was added to the granules; and the resulting mixture was mixed well and dry-compressed with a one-fourth inch regular concave punch and die. The resulting individual cores had a thickness of about 0.136 inch, a hardness of about 3 kg./cm.$^2$ (using a Strong Cobb Co. Tablet Hardness Tester) and a disintegration time of about 6–7 minutes.

The shell coating was prepared from the following ingredients.

| Ingredient: | Parts by weight |
|---|---|
| Aspirin-starch (90–10%) granulation | 1665 |
| Diluent granulation No. 16 mesh | 235 |

The above ingredients in the form of No. 16 mesh granules were mixed well; and the resulting mixture was dry-compressed around the core tablets using a seven-sixteenths inch regular concave punch and die. The resulting tablets had a thickness of about 0.187 inch, a hardness of about 9 kg./cm.$^2$ and assayed per tablet as follows:

| | | |
|---|---|---|
| Chloroquine phosphate | grams | 0.0498 |
| Aspirin | do | 0.298 |
| Free salicylic acid | percent | 0.07 |
| Moisture | do | 1.48 |
| Average weight | grams | 0.503 |
| Disintegration time [1] | minutes | 5 to 8 |

[1] Disintegration times listed here and elsewhere in the specification were determined according to a standard method described on page 936 of the "Pharmacopoeia of the United States," Fifteenth Revision, 1955.

The tablets were then packaged in amber glass bottles and stored at 35° C. Subsequent assays are given as follows:

| | 1 month | 3 months | 6 months | 8 months |
|---|---|---|---|---|
| Chloroquine phosphate (grams) | 0.0503 | | | 0.0510 |
| Free salicylic acid (percent) | 0.09 | 0.12 | 0.11 | 0.24 |
| Average weight (grams) | 0.5000 | 0.4969 | | 0.4984 |
| Disintegration time (minutes) | 7–9 | 7–8 | 8–10 | 8–9 |

Conventional tablets each weighing about 0.45 g. and containing about 0.025 g. of chloroquine phosphate and about 0.30 g. of aspirin were prepared using the following ingredients.

| Ingredient: | Parts by weight |
|---|---|
| Chloroquine phosphate (96.93%) | 25.8 |
| Aspirin No. 20 mesh | 300.0 |
| Starch | 45.0 |
| Talcum | 45.0 |
| Diluent granulation No. 16 mesh | 34.2 |

All of the above ingredients were mixed and passed through a No. 30 mesh screen; mixed well and dry-slugged; reduced to a No. 12 mesh granules; and dry-compressed with a seven-sixteenths regular concave punch and die. The resulting tablets had a bitter taste, a thickness of about 0.165–0.168 inch, a hardness of about 8–9 kg./cm.$^2$ and assayed per tablet as follows:

| | | |
|---|---|---|
| Chloroquine phosphate | grams | 0.0235 |
| Aspirin | do | 0.304 |
| Free salicylic acid | percent | 0.098 |
| Moisture | do | 1.24 |
| Average weight | grams | 0.4489 |
| Disintegration time | minutes | 1.5–3 |

After these tablets had been stored in amber glass bottles for three months at 35° C., they were grey in color, had an odor of acetic acid and contained needle-like crystals, indicating breakdown of the aspirin to form acetic acid and free salicylic acid crystals.

*Example 3*

Tablets each weighing about 0.5 g. and containing a dry-compressed core comprising about 0.06 g. of hydroxychloroquine sulfate and a dry-compressed shell coating comprising about 0.3 g. of aspirin were prepared as follows.

The core was prepared using the following ingredients.

| Ingredient: | Parts by weight |
|---|---|
| Hydroxychloroquine sulfate (98.2%) | 305.5 |
| Diluent granulation No. 16 mesh | 78.5 |
| Starch | 150.0 |
| Talcum | 60.0 |
| Stearic acid | 6.0 |

After the hydroxychloroquine sulfate had been passed through a No. 20 mesh screen, all of the above ingredients except the stearic acid were mixed well. The mixture was then dry-slugged and the slugs were reduced to No. 16 mesh granules. The stearic acid was then added to the granules; and the resulting mixture was mixed well and dry-compressed with a one-fourth inch regular concave punch and die. The resulting individual cores had a thickness of about 0.135 inch, a hardness of about 6 kg./cm.$^2$ and a disintegration time of about 8 minutes.

The shell coating was prepared using the following ingredients.

| Ingredient: | Parts by weight |
|---|---|
| Aspirin-starch (90–10%) granulation | 1665 |
| Diluent granulation No. 16 mesh | 235 |

The above ingredients in the form of granules (No. 16 mesh) were mixed well; and the resulting mixture was dry-compressed around the core tablets using a seven-sixteenths inch regular concave punch and die. The resulting tablets had a thickness of about 0.188 inch, a hardness of about 8–10 kg./cm.$^2$ and assayed per tablet as follows:

| | |
|---|---|
| Hydroxychloroquine sulfate grams | 0.0611 |
| Aspirin do | 0.308 |
| Free salicylic acid percent | 0.071 |
| Moisture do | 1.42 |
| Average weight grams | 0.4942 |
| Disintgeration time minutes | 7–8 |

The tablets were then packaged in amber glass bottles and stored at 35° C. Subsequent assays are given as follows:

| | 1 month | 3 months | 6 months |
|---|---|---|---|
| Hydroxychloroquine sulfate (grams) | 0.0615 | | |
| Aspirin (grams) | 0.293 | | |
| Free salicylic acid (percent) | 0.11 | 0.144 | 0.16 |
| Average weight (grams) | | 0.4951 | 0.4953 |
| Disintegration time (minutes) | 10–12 | 10–11 | 11–13 |

Satisfactory tablets were also formulated according to the above procedure using magnesium stearate in place of stearic acid.

Conventional tablets each weighing about 0.45 g. and containing about 0.030 g. of hydroxychloroquine sulfate and about 0.30 g. of aspirin were prepared using the following ingredients.

| Ingredient: | Parts by weight |
|---|---|
| Hydroxychloroquine sulfate (98.2%) | 30.55 |
| Aspirin No. 80 mesh | 300.00 |
| Starch | 45.00 |
| Talcum | 45.00 |
| Diluent granulation No. 16 mesh | 29.45 |

The above ingredients were mixed and passed through a No. 30 mesh screen; mixed well and dry slugged; reduced to No. 12 mesh granules; and compressed with a thirteen thirty-second inch (13/32″) regular concave punch and die. The resulting tablets had a bitter taste, a thickness of about 0.185–0.190 inch, hardness of about 7–8 kg./cm.$^2$ and assayed per tablet as follows:

| | |
|---|---|
| Hydroxychloroquine sulfate grams | 0.032 |
| Aspirin do | 0.305 |
| Free salicylic acid percent | 0.072 |
| Moisture do | 0.66 |
| Average weight grams | 0.4473 |
| Disintegration time | 54–96 |

After these tablets had been stored in ambler glass bottles for three months at 35° C., they had a grayish appearance, an odor of acetic acid, a hardness of 12–14 kg. and a free salicylic acid content of 0.435%.

*Example 4*

Tablets were made according to the procedure described in Example 2 having the following ingredients per tablet.

| Ingredient: | Weight, grams per tablet |
|---|---|
| Core— | |
| Chloroquine phosphate (96.93%) | 0.0258 |
| Diluent granulation No. 16 mesh | 0.0690 |
| Starch | 0.0120 |
| Talcum | 0.0120 |
| Magnesium stearate | 0.0012 |
| Shell— | |
| Aspirin-starch (90–10%) granulation | 0.3330 |
| Diluent granulation No. 16 mesh | 0.0970 |

ASSAY DATA

| | Original | 3 Months at 35° C. |
|---|---|---|
| Average tablet weight (grams) | 0.548 | |
| Chloroquine phosphate (grams) | 0.0235 | |
| Aspirin (grams) | 0.290 | |
| Free salicylic acid (percent) | 0.092 | 0.13 |
| Disintegration (minutes) | 3–25 | 9–13 |
| Moisture (percent) | 1.3 | |

*Example 5*

Tablets were prepared according to the procedure described in Example 3 having the following ingredients per tablet.

| Ingredient: | Weight, grams per tablet |
|---|---|
| Core— | |
| Hydroxychloroquine sulfate (98.95%) | 0.0303 |
| Diluent granulation No. 16 mesh | 0.0465 |
| Starch | 0.0300 |
| Talcum | 0.0120 |
| Magnesium stearate | 0.0012 |
| Shell— | |
| Aspirin-starch (90–10%) granulation | 0.3330 |
| Diluent granulation No. 16 mesh | 0.0970 |

ASSAY DATA

| | Original | 3 Months at 35° C. |
|---|---|---|
| Average tablet weight (grams) | 0.5480 | 0.5481 |
| Hydroxychloroquine sulfate (grams) | 0.0291 | |
| Aspirin (grams) | 0.304 | |
| Free salicylic acid (percent) | 0.115 | 0.12 |
| Disintegration (minutes) | 5–12 | 6–9 |

We claim:
1. A stable medicinal composition in tablet form composed of a dry-compressed core comprising a 4-aminoquinoline-type antimalarial drug and adjuvants, and a dry-compressed shell coating comprising a salicylate and adjuvants, said finished tablet on storage retaining its original salicylate content, physical appearance and disintegration time of the order of 3 to 25 minutes.

2. A stable medicinal composition in tablet form composed of a dry-compressed core comprising an acid-addition salt of chloroquine, diluent, disintegrator and lubricant, and a dry-compressed shell coating comprising a salicylate, disintegrator and diluent, said finished tablet on storage retaining its original salicylate content, physical appearance and disintegration time of the order of 3 to 25 minutes.

3. A stable medicinal composition in tablet form composed of a dry-compressed core comprising an acid-addition salt of hydroxychloroquine, diluent, disintegrator and lubricant, and a dry-compressed shell coating comprising a salicylate, disintegrator and diluent, said finished tablet on storage retaining its original salicylate content, physical appearance and disintegration time of the order of 3 to 25 minutes.

4. A stable medicinal composition in tablet form composed of a dry-compressed core comprising chloroquine phosphate, starch, lactose, dibasic calcium phosphate and lubricant, and a dry-compressed shell coating comprising aspirin, starch, lactose and dibasic calcium phosphate, said finished tablet on storage retaining its original aspirin content, physical appearance and disintegration time of the order of 3 to 25 minutes.

5. A stable medicinal composition in tablet form composed of a dry-compressed core comprising hydroychloroquine sulfate, starch, lactose, dibasic calcium phosphate and lubricant, and a dry-compressed shell coating comprising aspirin, starch, lactose and dibasic calcium phosphate, said finished tablet on storage retaining its original aspirin content, physical appearance and disintegration time of the order of 3 to 25 minutes.

6. A process for the preparation of a stable medicinal composition in tablet form which comprises dry-compressing in granular form a 4-aminoquinoline-type antimalarial drug and adjuvants and dry-compressing in granular form around the resulting core tablet a shell coating comprising a salicylate and adjuvants, said finished tablet on storage retaining its original salicylate content, physical appearance and disintegration time of the order of 3 to 25 minutes.

7. A process for the preparation of a stable medicinal composition in tablet form which comprises dry-compressing in granular form an acid-addition salt of chloroquine, diluent, disintegrator and lubricant, and dry-compressing in granular form around the resulting core tablet a shell coating comprising a salicylate, disintegrator and diluent, said finished tablet on storage retaining its original salicylate content, physical appearance and disintegration time of the order of 3 to 25 minutes.

8. A process for the preparation of a stable medicinal composition in tablet form which comprises dry-compressing in granular form an acid-addition salt of hydroxychloroquine, diluent, disintegrator and lubricant, and dry-compressing in granular form around the resulting core tablet a shell coating comprising a salicylate, disintegrator and diluent, said finished tablet on storage retaining its original salicylate content, physical appearance and disintegration time of the order of 3 to 25 minutes.

9. A process for the preparation of a stable medicinal composition in tablet form which comprises dry-compressing in granular form chloroquine phosphate, starch, lactose, dibasic calcium phosphate and lubricant and dry-compressing in granular form around the resulting core tablet a shell coating comprising aspirin, starch, lactose and dibasic calcium phosphate, said finished tablet on storage retaining its original aspirin content, physical appearance and disintegration time of the order of 3 to 25 minutes.

10. A process for the preparation of a stable medicinal composition in tablet form which comprises dry-compressing in granular form hydroxychloroquine sulfate, starch, lactose, dibasic calcium phosphate and lubricant and dry-compressing in granular form around the resulting core tablet a shell coating comprising aspirin, starch, lactose and dibasic calcium phosphate, said finished tablet on storage retaining its original aspirin content, physical appearance and disintegration time of the order of 3 to 25 minutes.

References Cited in the file of this patent

UNITED STATES PATENTS 2,757,124  Wolff ---------------- July 31, 1956

OTHER REFERENCES

Drug and Cosmetic Industry, article on aspirin, December 1955, page 829.

Journal of Lab. and Clinical Med., article by Brennecke et al., pages 795–796, November 1951.

Drug Trade News, Feb. 16, 1953, page 73.

J.A.M.A., vol. 152, No. 4, pages 323–331, May 23, 1953.

Tsevdos: Drug and Cosmetic Industry, January 1956, pages 38–40, 113–114.

Windheuser et al.: J.A.P.A., Sci. Ed., vol. 45, No. 8, August 1956, pages 542–45.

Cooper et al.: Drug and Cosmetic Industry, August 1956, pages 188, 277, 278–280.

"New Chemotherapy of Rheumatoid Arthritis with Aralen," copyright 1957, Winthrop Laboratories, N.Y., N.Y., 14 pages.

UNITED STATES PATENT OFFICE
CERTIFICATE OF CORRECTION

Patent No. 3,019,169                  January 30, 1962

Theodore G. Klumpp et al.

It is hereby certified that error appears in the above numbered patent requiring correction and that the said Letters Patent should read as corrected below.

Column 2, line 8, for "magnesum" read -- magnesium --; column 5, line 53, for "Disintegration time -----54-96" read -- Disintegration time ----- minutes ---54-96 --; column 5, line 55, for "ambler" read -- amber --; column 6, lines 71 and 72, for "hydrocychloroquine" read -- hydroxychloroquine --.

Signed and sealed this 30th day of October 1962.

(SEAL)
Attest:

ERNEST W. SWIDER
Attesting Officer

DAVID L. LADD
Commissioner of Patents